(12) United States Patent  (10) Patent No.: US 8,538,889 B2
Bhave et al.  (45) Date of Patent: Sep. 17, 2013

(54) APPLICATION HIERARCHY AND STATE MANIPULATION

(75) Inventors: Ajay Arvind Bhave, Redmond, WA (US); Mark Walter Zagorski, Redmond, WA (US); Tarik Soulami, Redmond, WA (US); Brian S. Perlman, Bothell, WA (US); Ning Zhang, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 855 days.

(21) Appl. No.: 12/145,506

(22) Filed: Jun. 25, 2008

(65) Prior Publication Data

US 2009/0327090 A1  Dec. 31, 2009

(51) Int. Cl.
*G06F 21/00* (2013.01)

(52) U.S. Cl.
USPC ............... 705/59; 705/57; 705/902; 726/32; 726/33

(58) Field of Classification Search
USPC ...................................... 705/50–59
See application file for complete search history.

(56) References Cited

U.S. PATENT DOCUMENTS

| | | | |
|---|---|---|---|
| 5,191,646 A | | 3/1993 | Naito et al. |
| 5,581,797 A * | | 12/1996 | Baker et al. .................. 715/708 |
| 5,758,068 A * | | 5/1998 | Brandt et al. .................. 726/27 |
| 5,973,687 A | | 10/1999 | Foley et al. |
| 6,157,915 A * | | 12/2000 | Bhaskaran et al. ............... 705/7 |
| 6,169,976 B1 * | | 1/2001 | Colosso ........................ 705/59 |
| 6,725,367 B2 * | | 4/2004 | Morrison et al. ................. 713/1 |
| 6,904,523 B2 * | | 6/2005 | Bialick et al. ................. 713/156 |
| 7,024,393 B1 * | | 4/2006 | Peinado et al. ................. 705/59 |
| 7,076,496 B1 * | | 7/2006 | Ruizandrade ................. 717/170 |
| 7,107,482 B2 * | | 9/2006 | Murai et al. ....................... 714/6 |
| 7,188,335 B1 * | | 3/2007 | Darr et al. ..................... 717/121 |
| 7,234,636 B1 * | | 6/2007 | Brausch et al. ................ 235/379 |
| 7,487,353 B2 * | | 2/2009 | Pryor et al. .................... 713/170 |
| 7,657,545 B2 * | | 2/2010 | Bird .............................. 715/205 |
| 2002/0129106 A1 | | 9/2002 | Gutfreund |
| 2004/0034770 A1 * | | 2/2004 | Kaler et al. .................... 713/155 |
| 2004/0093593 A1 * | | 5/2004 | Jhanwar et al. ............... 717/169 |
| 2004/0117631 A1 * | | 6/2004 | Colvin .......................... 713/179 |
| 2004/0153658 A1 * | | 8/2004 | Gunyakti et al. ............. 713/193 |
| 2004/0193545 A1 * | | 9/2004 | Shlasky .......................... 705/59 |
| 2005/0015343 A1 * | | 1/2005 | Nagai et al. ..................... 705/59 |
| 2005/0055692 A1 | | 3/2005 | Lupini et al. |

(Continued)

OTHER PUBLICATIONS

Strunk and White. The Elements of Style. 1979. Macmillan Publishing Co., Inc. 3rd Edition. p. 40.*

(Continued)

*Primary Examiner* — Calvin Cheung

(57) ABSTRACT

An instance of an application hierarchy can be stored on a client computer to facilitate enforcement of software licensing by a software license component of a software protection system. The application hierarchy is a tree structure (e.g., unordered) that includes a top node, one or more product offering group(s), and, one or more selling unit(s).

A computer-implemented software protection system can facilitate enforcement of software licensing on a client computer. The software protection system includes a software license component that can store and enforce software licensing rule(s). The software license component can further manipulate state data of an instance of the application hierarchy stored in a licensing data store via application program interface(s) (APIs). State data and/or property(ies) of a particular node of the instance of the application hierarchy can be accessed through the API via an assigned identifier.

11 Claims, 8 Drawing Sheets

(56) References Cited

U.S. PATENT DOCUMENTS

| | | | |
|---|---|---|---|
| 2005/0091168 A1* | 4/2005 | Gunyakti et al. | 705/59 |
| 2005/0102652 A1 | 5/2005 | Sulm et al. | |
| 2005/0114265 A1* | 5/2005 | Satkunanathan et al. | 705/59 |
| 2005/0183058 A1* | 8/2005 | Meijer et al. | 717/100 |
| 2005/0251487 A1* | 11/2005 | Evans et al. | 705/59 |
| 2006/0021012 A1* | 1/2006 | Ito | 726/5 |
| 2006/0085355 A1* | 4/2006 | Coley et al. | 705/59 |
| 2006/0089917 A1* | 4/2006 | Strom et al. | 705/59 |
| 2006/0178778 A1 | 8/2006 | Fuhlbrigge et al. | |
| 2006/0184590 A1* | 8/2006 | Frank et al. | 707/202 |
| 2006/0242081 A1* | 10/2006 | Ivanov et al. | 705/59 |
| 2006/0242183 A1* | 10/2006 | Niyogi et al. | 707/101 |
| 2006/0259949 A1* | 11/2006 | Schaefer et al. | 726/1 |
| 2007/0083860 A1* | 4/2007 | Bhave et al. | 717/170 |
| 2007/0130079 A1* | 6/2007 | Ivanov et al. | 705/59 |
| 2007/0143223 A1* | 6/2007 | Bhave et al. | 705/59 |
| 2007/0277038 A1* | 11/2007 | Hardy et al. | 713/176 |
| 2008/0082449 A1* | 4/2008 | Wilkinson et al. | 705/59 |
| 2008/0091613 A1* | 4/2008 | Gates et al. | 705/59 |
| 2008/0306874 A1* | 12/2008 | White | 705/64 |
| 2009/0276269 A1* | 11/2009 | Yee et al. | 705/8 |

OTHER PUBLICATIONS

Bruno et al. "Extending XQuery with Transformation Operators," SiS, Universite de Toulon et du Var, http://delivery.acm.org/10.1145/960000/958223/p1-bruno.pdf?key1=958223&key2=6677319711&coll=GUIDE&dl=GUIDE&CFID=22392843&CFTOKEN=64259011, last accessed May 23, 2007, 8 pages, La Garde Cedex, France. NPL found in U.S. Appl. No. 12/054,817.*

May et al. "On an XML Data Model for Data Integration," http://www.dbis.informatik.uni-goettingen.de/Publics/01/fmldo01final.ps, Institut fur Informatik, Universitat Freiburg, last accessed May 23, 2007, 16 pages, Germany. NPL found in U.S. Appl. No. 12/054,817.*

"Computer Programming Software Terms, Glossary and Dictionary." Oct. 18, 2007. All pages. Retrieved via Wayback Machine on May 24, 2010. http://web.archive.org/web/20071018004016/http://javvin.com/softwareglossary/Recursive.html.*

"Software Engineering Terminology." Nov. 29, 2006. All pages. Retrieved via Wayback Machine on May 24, 2010. http://w3.umh.ac.be/genlog/SE/SE-contents.html.*

"Certificate of Authenticity Article." Feb. 25, 2007. All pages. Retrieved via Wayback Machine on May 24, 2010. http://certificateofauthenticity.com/coaarticle.htm.*

Iida et al., "Generating Software Development Environments from the Description of Product Relations", Proceedings of the Fifteenth Computer Software and Applications Conference, 1991. COMPSAC apos;91 Sep. 11-13, 1991 pp. 487-492.

Nguyen et al., "Structure-oriented Product Versioning", Proceedings of the International Conference on Information Technology: Coding and Computing (ITCC'05), vol. 2, Issue, Apr. 4-6, 2005, pp. 455-460.

* cited by examiner

APPLICATION HIERARCHY AND STATE MANIPULATION

BACKGROUND

Software licensing has grown increasingly complex as offerings of software products (selling units), groupings of software products, and varieties of software products have increased. Frequently, software product(s) employ a grace period during which a user can evaluate a particular software product.

Typically, original equipment manufacturers (OEMs) stage an application installation of a client computer on an image of an operating system and then fine tune the installation before shipping the client computer to a customer. Fine tuning of the application installation can trigger an activation timer, so OEMs are permitted to reset the activation timer in order for the customer to fully enjoy a grace period associated with the activation timer. The process of resetting the activation timer can be referred to as "rearming".

Rearming applications is also useful when a customer desires to have an extended grace time period. In both retail and enterprise environments, customers may desire to have an extended grace period in order to fully evaluate the application. To facilitate this extended grace period, the activation timer can be rearmed one or more times per application.

For example, a system administrator for a large enterprise can obtain a copy of a suite of applications to evaluate without activation. If the system administrator desires to evaluate the suite for ninety days without activation, with a standard activation grace timer of thirty days, the system administrator can run a rearm tool to reset the grace timer every thirty days. The reset would generally have no effect on an absolute evaluation expiration of the suite.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An application hierarchy is a tree structure that represents logical product offering(s), for example, of software application(s). An instance of the application hierarchy can be stored on a client computer to facilitate enforcement of software licensing by a software license component of a software protection system.

The application hierarchy is a tree structure (e.g., unordered) that includes a top node, one or more product offering group(s), and, one or more selling unit(s). A product offering group can be an intermediate level of organization of selling unit(s), for example, product(s) such as application(s) sold in similar channel(s), based on commonality of offering and/or similarities in an enforcement mechanism.

An identifier can be assigned to each node of the application hierarchy. Thus, state data and/or property(ies) of a particular node can be accessed (e.g., through an application program interface (API)) of the software license component via the assigned identifier. For example, a rearm count associated with a particular node can be accessed through the application program interface via the assigned identifier.

The application hierarchy can, for example, represent an entire application suite, where the top node represents the product and the product offering group(s) represents logical selling and/or marketing unit(s). The top node, product offering group and/or the selling unit(s) can have associated state data, for example, license property(ies) that can be accessible for manipulation. In one example, the state data can facilitate the assignment of license rights to selling units of a particular product offering group.

Optionally, two or more distinct selling units can be grouped into a product uniqueness group. A product uniqueness group can include selling unit(s) from one or more product offering group(s). For example, product uniqueness group(s) can be used to reduce operational complexity when selling units sold in different channels interface with a backend server in a particular manner. Thus, instead of deploying interfaces for each distinct selling unit, a single deployment can interface with the selling units of a particular product uniqueness group.

A computer-implemented software protection system can facilitate enforcement of software licensing on a client computer. The software protection system includes a software license component that can store and enforce software licensing rule(s).

The software license component can further manipulate state data of an instance of the application hierarchy stored in a licensing data store via application program interface(s) (APIs). State data and/or property(ies) of a particular node of the instance of the application hierarchy can be accessed through the API via an assigned identifier.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
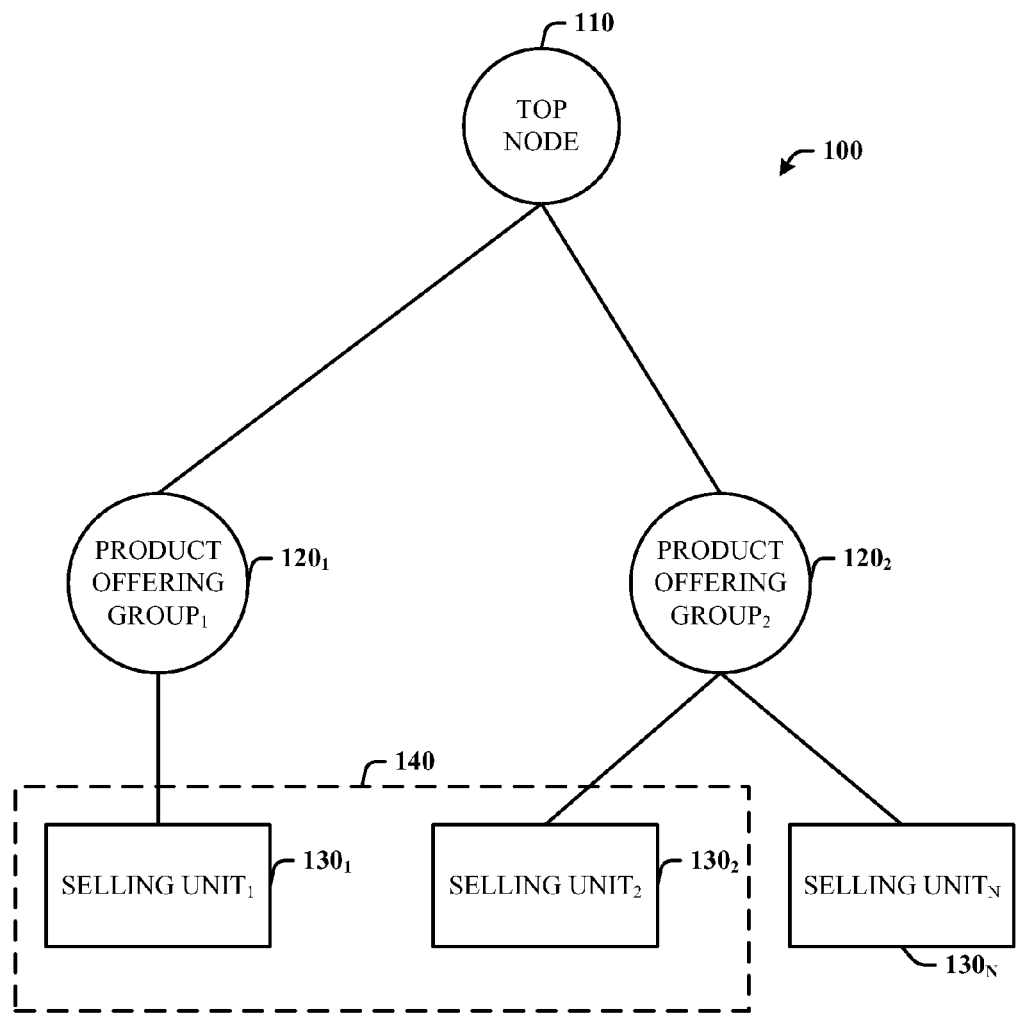
FIG. 1 illustrates an application hierarchy.

An application hierarchy is a tree structure that represents logical product offering(s), for example, of software application(s). An instance of the application hierarchy can be stored on a client computer to facilitate enforcement of software licensing by a software license component of a software protection system.

The application hierarchy is a tree structure (e.g., unordered) that includes a top node, one or more product offering group(s), and, one or more selling unit(s). A product offering group can be an intermediate level of organization of selling unit(s), for example, product(s) such as application(s) sold in similar channel(s), based on commonality of offering and/or similarities in an enforcement mechanism.

An identifier can be assigned to each node of the application hierarchy. Thus, state data and/or property(ies) of a particular node can be accessed (e.g., through an application program interface (API)) of the software license component via the assigned identifier. For example, a rearm count associated with a particular node can be accessed through the application program interface via the assigned identifier.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates an application hierarchy 100. The application hierarchy 100 is a tree structure that represents logical product offering(s), for example, of software application(s). For example, an instance of the application hierarchy 100 can be stored on a client computer (not shown) to facilitate enforcement of software licensing, as discussed in greater detail below.

The application hierarchy 100 is a tree structure (e.g., unordered) that includes a top node 110, one or more product offering group(s) 120, and, one or more selling unit(s) 130. A product offering group 120 can be an intermediate level of organization of selling unit(s) 130, for example, product(s) such as application(s) sold in similar channel(s), based on commonality of offering and/or similarities in an enforcement mechanism.

In one embodiment, the application hierarchy 100 can represent an application suite, where the top node 110 represents the product and the product offering group(s) 120 represents logical selling and/or marketing unit(s). It is to be appreciated that while only one level of product offering group(s) 120 is illustrated in the application hierarchy 100 of FIG. 1, the application hierarchy 100 can include one or more levels of product offering group(s) 120. The selling unit(s) 130 (e.g., leaf node(s) of the tree) represent specific selling units in each of the channels.

In this embodiment, an identifier (e.g., globally unique identifier (GUID)) can be assigned to each node (top node 110, product offering group(s) 120 and selling unit(s) 130) of the application hierarchy 100. Thus, state data and/or property(ies) of a particular node can be accessed (e.g., through an application program interface (API)) via the assigned identifier. For example, a rearm count associated with a particular node can be accessed through an application program interface via the assigned identifier.

For example, the top node 110 can represent a suite of products, the product offering group 120 can represent one or more logic selling channels (e.g., retail, OEM, etc.). Finally, the selling unit(s) 130 can represent a physical selling unit of the suite of products (e.g., word processor application, spreadsheet application, database application, email application, etc.).

The top node 110, product offering group 120 and/or selling unit(s) 130 can have associated state data, for example, license property(ies) that can be accessible for manipulation. In one example, the state data can facilitate the assignment of license rights to selling units 130 of a particular product offering group 120.

For example, a particular product offering group 120 can have a rearm count associated with the particular product offering group 120. In one example, rearm is a method to restore a particular system to an initial inactivated state by resetting a grace timer and other data protected by a security processor (e.g., a component designed to store and protect data). A rearm generally clears a timer at a particular level (e.g., top node 110, product offering group 120 or selling unit 130), but only up to a specific number of allowances (e.g., rearm count).

In one embodiment, there is no implied relationship between data at higher level node and child node(s) associated with the higher level node. However, in this embodiment, data available at a higher level node is available to child node(s).

For example, a particular product offering group 120 can have a rearm count of five. Selling unit(s) 130 associated with the particular product offering group 120 can likewise have an initial rearm count of five, based on the rearm count associated with the particular product offering group 120. However, as noted previously, data associated with the selling unit(s) 130 can be separately manipulated. Thus, based on operation(s) performed at each level, an actual number of rearms performed may be different. For example, an OEM can choose to rearm a particular selling unit 130 three times while choosing to rearm a different selling unit 130 two times.

Optionally, two or more distinct selling units 130 can be grouped into a product uniqueness group 140. A product uniqueness group 140 can include selling unit(s) 130 from one or more product offering group(s) 120. For example, a retail offering of a word processing application and an OEM offering of a word processing application can be grouped under a word processing product uniqueness group 140.

In one embodiment, product uniqueness group(s) 140 can be used to reduce operational complexity when selling units 130 sold in different channels interface with a backend server in a particular manner. Thus, instead of deploying interfaces for each distinct selling unit 130, a single deployment can interface with the selling units 130 of a particular product uniqueness group 140.

Continuing with the example of a retail offering of a word processing application and an OEM offering of a word processing application grouped under a word processing product uniqueness group 140. Instead of deploying separate validation templates for each selling unit 130, a validation server can deploy a single validation template for the product uniqueness group 140. The single validation template can be used to validate selling units 130 of the product uniqueness group 140.

Figure 2:
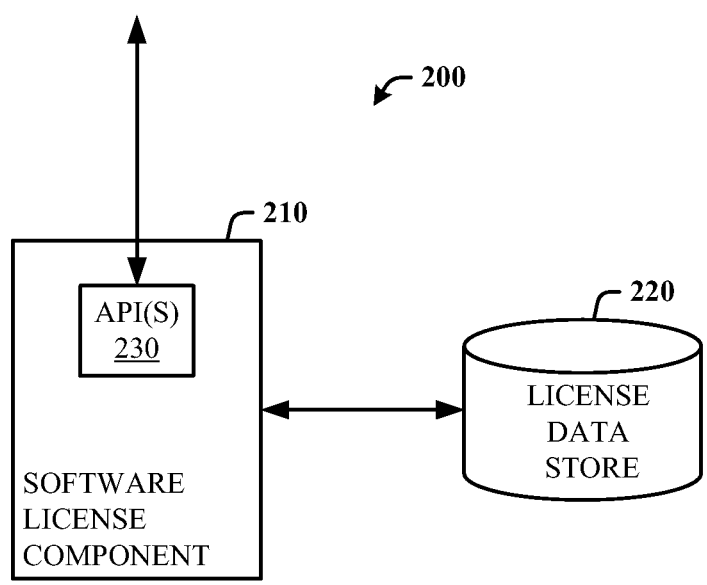
FIG. 2 illustrates a computer-implemented software protection system.

FIG. 2 illustrates a computer-implemented software protection system 200. The software protection system 200 can facilitate enforcement of software licensing on a client computer. The software protection system 200 includes a software license component 210 that can store and enforce software licensing rule(s).

The software license component 210 can further manipulate state data of an instance of the application hierarchy 100 stored in a licensing data store 220 via application program interface(s) (APIs) 230. State data and/or property(ies) of a particular node of the instance of the application hierarchy 100 can be accessed, for example, through the API 230 via an assigned identifier.

In one embodiment, the software protection system 200 can be a component of a client computer. In another embodiment, the software license component 210 can reside on a server computer system while the licensing data store 220 is stored on a client computer. In yet another embodiment, the software protection system 200 can be a component of a server computer system.

In one embodiment, the software license component 210 stores software licensing rule(s) providing for manipulation of state data of the application hierarchy 100 recursively in a top-down manner and not in a bottom-up manner. Thus, a state change at a higher level node (e.g., product offering group 120) has a ripple effect on child node(s) (e.g., selling unit(s) 130).

For example, a rearm at a particular product offering group 120 causes a rearm on selling unit(s) 130 associated with the particular product offering group 120. Similarly, a property indicating an estimation of non-genuineness associated with a particular product offering group 120 causes all selling unit(s) associated with the particular product offering group 120 to be considered non-genuine.

In this embodiment, a state change at a particular selling unit 130 deterministically affects the particular selling unit 130. The effect, if any, on associated product offering group 120 and/or top node 110 can be defined by a rule.

In one example, a rearm of a particular selling unit 130 does not automatically cause a corresponding increase in a rearm count of an associated product offering group 120. However, a rule can provide for rearm counts of other selling unit(s) 130 of the associated product offering group 120 to be decreased.

Similarly, in another example, a determination that a particular selling unit 130 is non-genuine does not automatically mean that an associated product offering group 120 is non-genuine. However, a rule can provide for propagation of a non-genuine property from a selling unit 130 to another selling unit of the same product offering group 120 (e.g., non-genuine property of word processing propagated to spreadsheet application).

Figure 3:
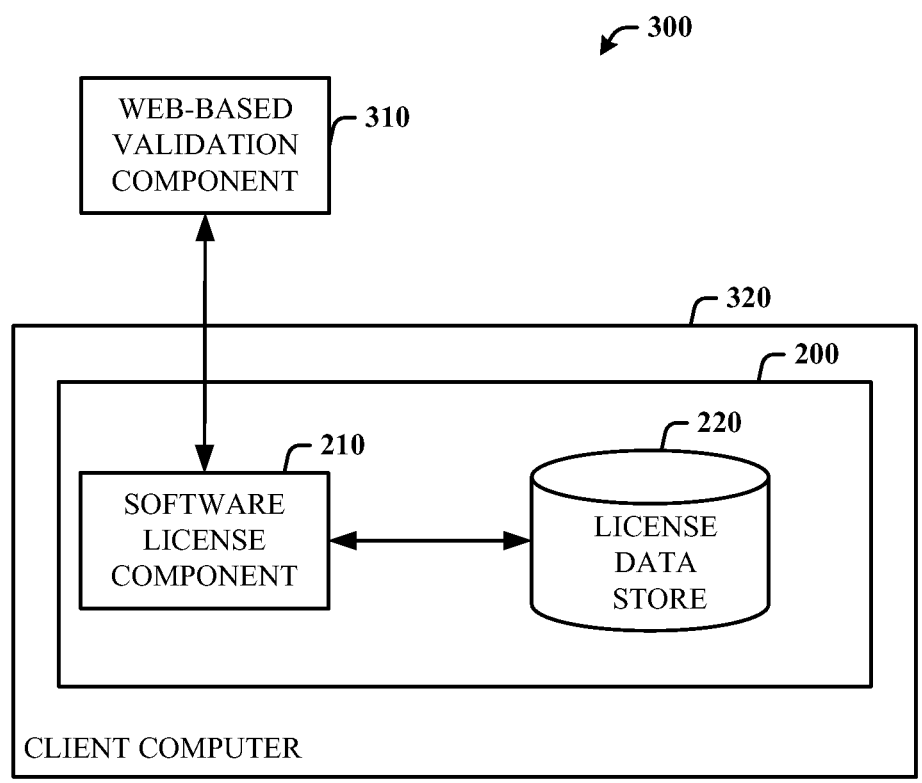
FIG. 3 illustrates a computer-implemented software validation system.

FIG. 3 illustrates a computer-implemented software validation system 300. The software validation system 300 includes a web-based validation component 310 which communicates with a client computer 320, for example, via the Internet. The client computer 320 includes a software protection system 200 having a software license component 210 and a licensing data store 220, as discussed previously.

For example, the client computer 320 can communicate with the web-based validation component 310 based upon an event, for example, a client computer request for an update, request for template etc. The software protection system 200 can provide information to the web-based validation component 310 based upon state data of an instance of the application hierarchy 100 stored in the licensing data store 220, for example, a genuine property of word processing application.

In this example, while the software license component 210 can enforce software licensing rules as discussed previously, the web-based validation component 310 can provide additional information to the software protection system 200 to affect behavior of the client computer 320. For example, the web-based validation component 310 can block access to web-based resource(s) such as software update(s), template(s) and/or disable selling unit(s) 130 associated with a particular product offering group 120, if one or more selling units 130 are reported to be non-genuine.

Additionally, the web-based validation component 310 can determine mismatched selling units 130. For example, a retail version of a word processing application and an OEM version of a spreadsheet application. The web-based validation component 310 can provide information to the client computer 320, for example, regarding correction of the mismatched selling units 130.

The web-based validation component 310 can further provide information regarding inconsistent installation of selling unit(s) 130, for example, retail and OEM versions of a word processing application installed on the client computer 320.

The web-based component 310 can further provide information to a user to facilitate correction of identified problem(s).

While use of the application hierarchy 100 has been described with respect to software protection and software licensing enforcement, those skilled in the art will recognize that the application hierarchy 100 can be employed to facilitate software inventory tracking, software asset management and the like.

Figure 4:
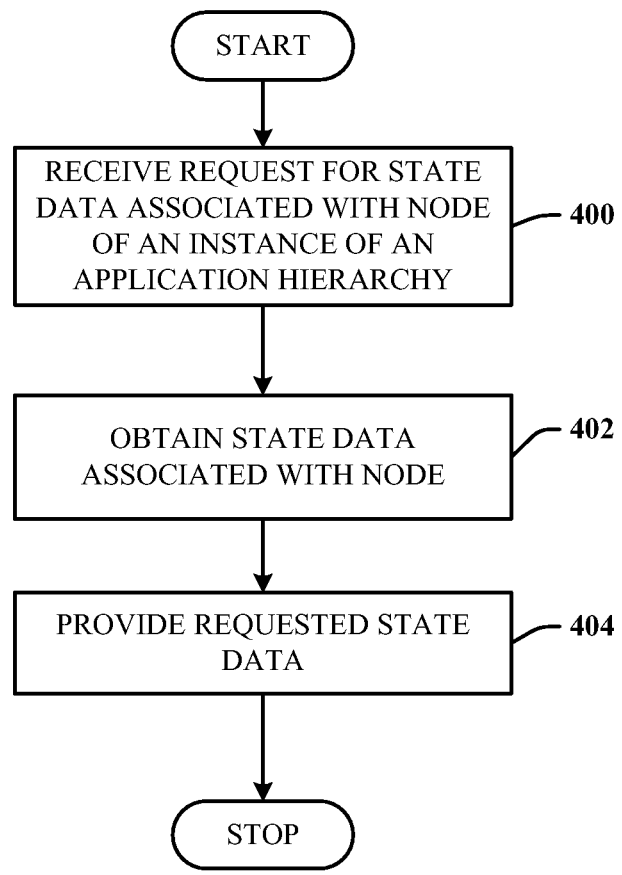
FIG. 4 illustrates a computer-implemented method of protecting software.

FIG. 4 illustrates a computer-implemented method of protecting software. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 400, a request for state data associated with a node of an instance of an application hierarchy is received. For example, the state data can be a rearm count associated with a selling unit 130.

At 402, state data associated with the node of the application hierarchy is obtained, for example, from a license data store 220. At 404, the requested state data is provided, for example, to a web-based validation component 310 and/or a software protection system.

Figure 5:
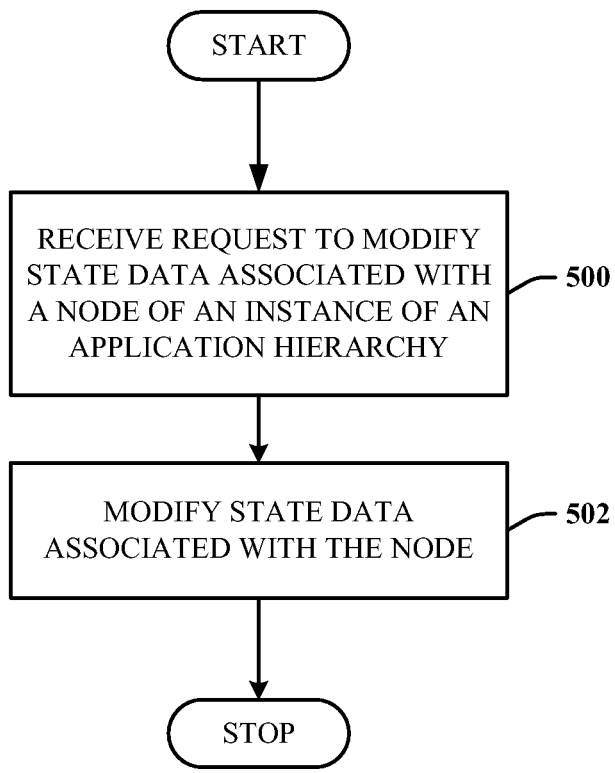
FIG. 5 illustrates a computer-implemented method of protecting software.

FIG. 5 illustrates a computer-implemented method of protecting software. At 500, a request to modify state data associated with a node of an instance of an application hierarchy is received. At 502, state data associated with the node is modified based on the request to modify. The modified state data can be stored, for example, in a license data store 200.

Figure 6:
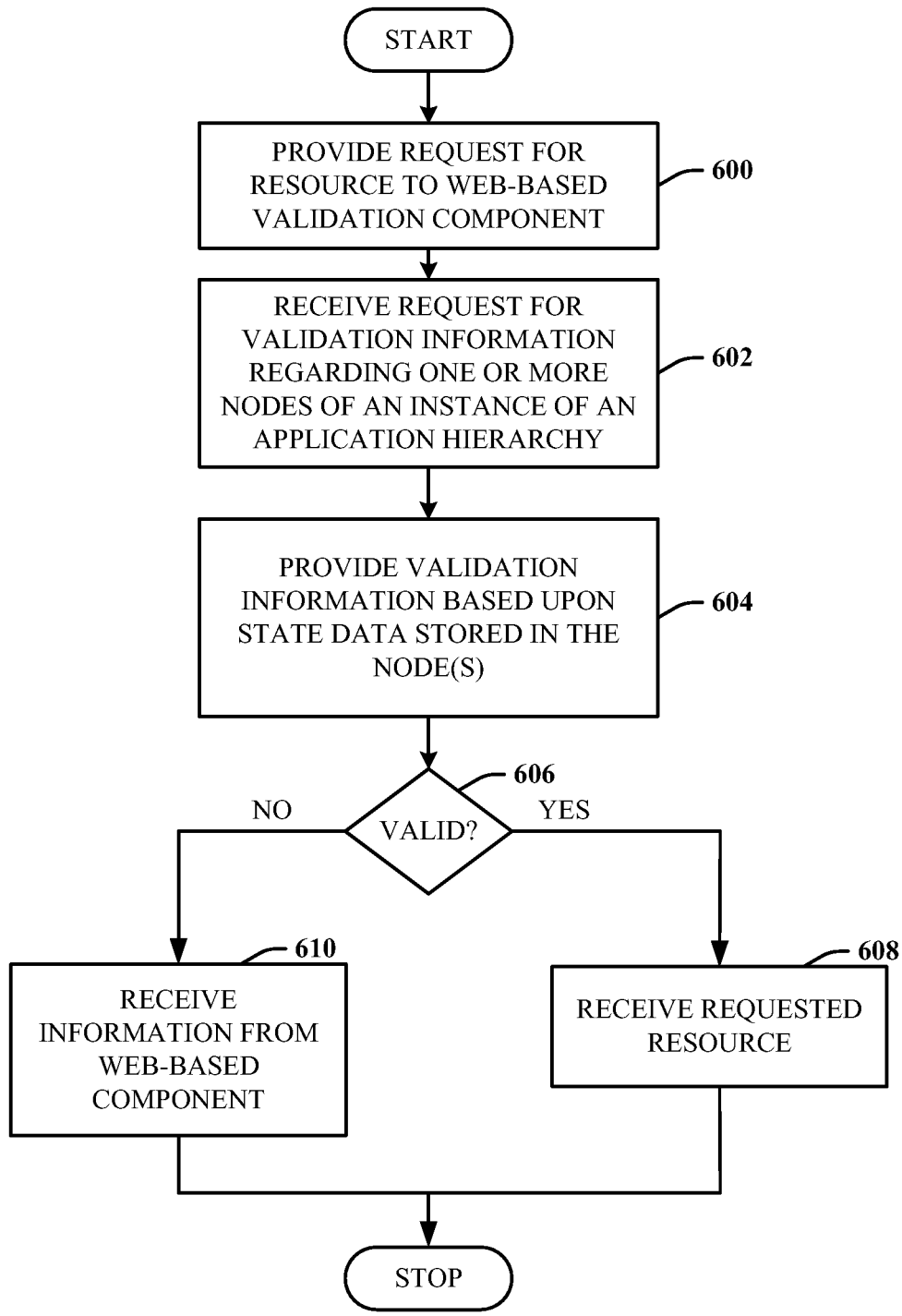
FIG. 6 illustrates a computer-implemented method facilitating software validation.

FIG. 6 illustrates a computer-implemented method facilitating software validation. At 600, a request for a resource (e.g., template, upgrade, etc.) is provided to a web-based validation component, for example, by an application. At 602, a request for validation information regarding one or more nodes of an instance of an application hierarchy is received (e.g., from the web-based validation component). For example, the validation information can be associated with one or more selling units 130, a product offering group 120 and/or a top node 110.

At 604, validation information is provided based upon state data stored in the node(s). At 606, a determination is made as to whether validation information provides that the node(s) are valid. If the determination at 606 is YES, at 608, the requested resource is received, and, the method ends. If the determination at 606 is NO, at 610, information is received from the web-based component, and, the method ends.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 7:
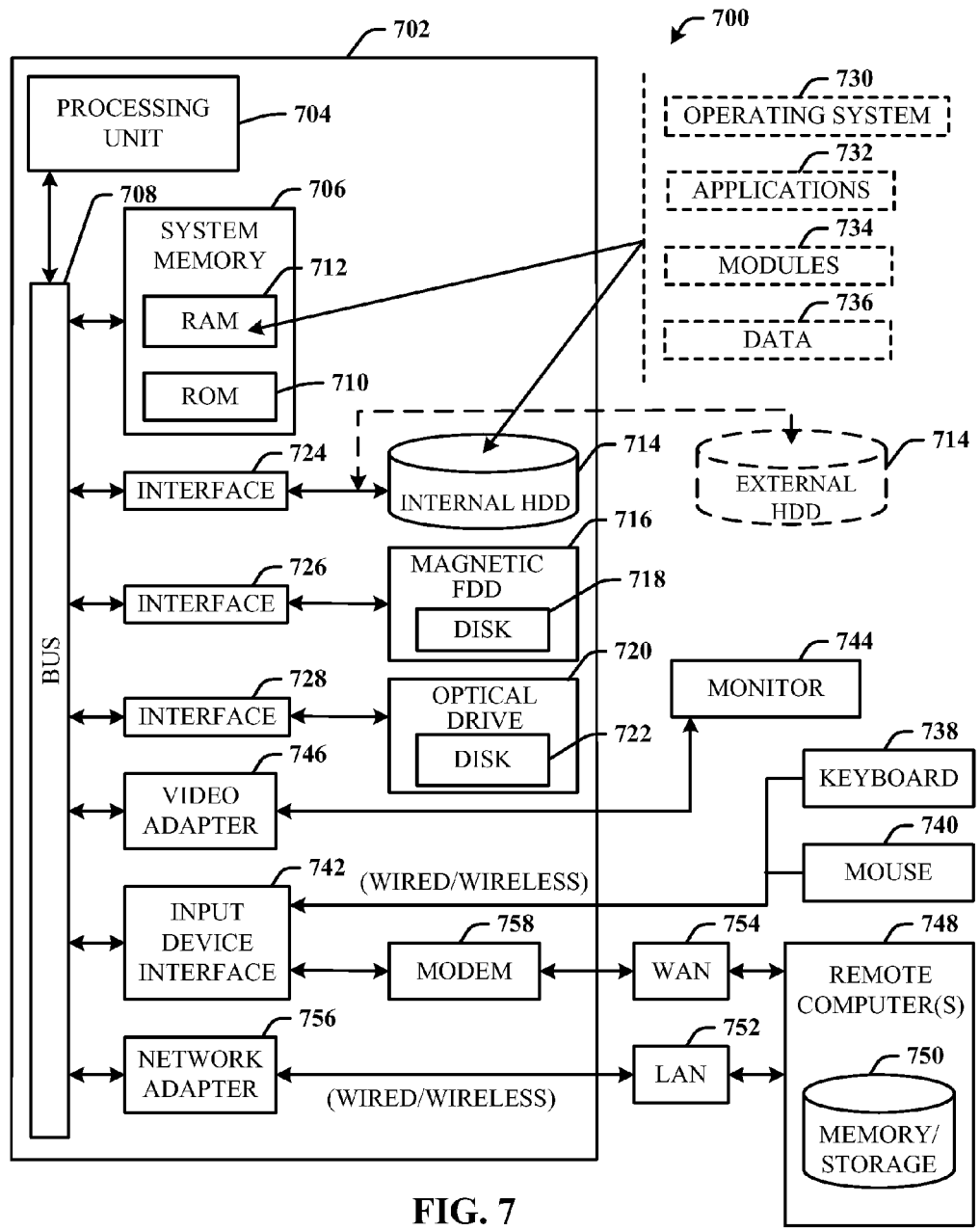
FIG. 7 illustrates a computing system operable to execute the disclosed architecture.

Referring now to FIG. 7, a block diagram of a computing system 700 operable to execute the disclosed software protection system is illustrated. In order to provide additional context for various aspects thereof, FIG. 7 and the following discussion are intended to provide a brief, general description of a suitable computing system 700 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 7, the computing system 700 for implementing various aspects includes a computer 702, the computer 702 including a processing unit 704, a system memory 706 and a system bus 708. The system bus 708 provides an interface for system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read-only memory (ROM) 710 and random access memory (RAM) 712. A basic input/output system (BIOS) is stored in the read-only memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The internal hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing novel methods of the disclosed architecture.

A number of program modules can be stored in the drives and RAM 712, including an operating system 730, one or more application programs 732, other program modules 734 and program data 736. All or portions of the operating system, applications, modules, and/or data can also be cached in the RAM 712. For example, the software protection system 200 can be stored in the drives and/or RAM 712. It is to be appreciated that the disclosed architecture can be implemented with various commercially available operating systems or combinations of operating systems.

A user can enter commands and information into the computer 702 through one or more wired/wireless input devices, for example, a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 via an interface, such as a video adapter 746. In addition to the monitor 744, a computer typically includes other peripheral output devices (not shown), such as speakers, printers, etc.

The computer 702 may operate in a networked environment using logical connections via wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated.

The logical connections depicted include wired/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wired and/or wireless communication network interface or adapter 756. The adapter 756 may facilitate wired or wireless communication to the LAN 752, which may also include a wireless access point disposed thereon for communicating with the wireless adapter 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wired or wireless device, is connected to the system bus 708 via the serial port interface 742. In a networked environment, program modules depicted relative to the computer 702, or portions thereof, can be stored in the remote memory/storage device 750. It will be appreciated that the network connections shown are examples and other means of establishing a communications link between the computers can be used.

The computer 702 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, for example, computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Figure 8:
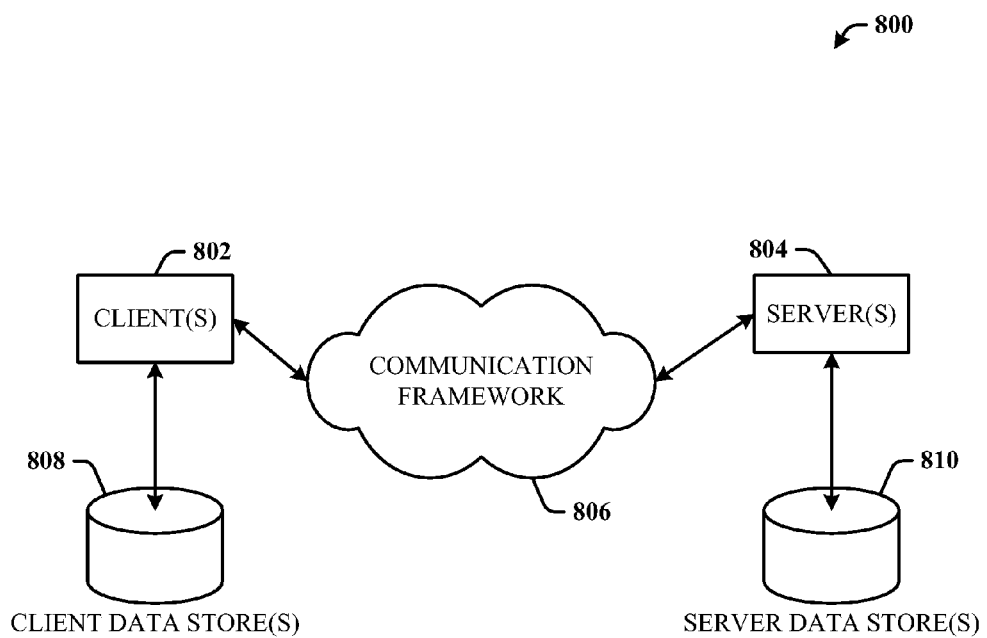
FIG. 8 illustrates a computing environment operable to execute the disclosed architecture.

Referring now to FIG. 8, there is illustrated a schematic block diagram of a computing environment 800 that facilitates software validation. The environment 800 includes one or more client(s) 802. The client(s) 802 can be hardware and/or software (e.g., threads, processes, computing devices). The client(s) 802 can house cookie(s) and/or associated contextual information, for example.

The environment 800 also includes one or more server(s) 804. The server(s) 804 can also be hardware and/or software (e.g., threads, processes, computing devices). The servers 804 can house threads to perform transformations by employing the architecture, for example. One possible communication between a client 802 and a server 804 can be in the form of a data packet adapted to be transmitted between two or more computer processes. The data packet may include a cookie and/or associated contextual information, for example. The environment 800 includes a communication framework 806 (e.g., a global communication network such as the Internet) that can be employed to facilitate communications between the client(s) 802 and the server(s) 804.

Communications can be facilitated via a wired (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented software protection system, comprising:
   a computer comprising a processing unit coupled to a memory, the computer comprising:
      a license data store that stores an instance of an application hierarchy, wherein the instance of the application hierarchy stores state data and a property for a plurality of nodes, wherein the state data is associated with a rearm count that indicates a quantity of remaining rearms, wherein the property is associated with a genuine marker associated with an associated node; and,
      a software license component for manipulating state data of the instance of the application hierarchy to facilitate enforcement of software licensing,
         wherein the software license component stores a software licensing rule for manipulating the state data of the instance of the application hierarchy, the software licensing rule provides for propagation of a non-genuine property from a first node to another node upon determination of an application associated with the first node being non-genuine,
         wherein the software license component comprises an application program interface that facilitates access of a node of the instance of the application hierarchy stored in the license data store, the application interface providing information regarding the property of a particular node to a web-based validation component.

2. The system of claim 1, wherein the license data store and the software license component are components of a client computer system.

3. The system of claim 1, wherein the software licensing rule further provides for manipulation of state data of the application hierarchy recursively in a top-down manner.

4. The system of claim 1, wherein the state data and a property of a particular node can be accessed through the application program interface via an assigned identifier.

5. The system of claim 1, wherein the instance of the application hierarchy comprises a top node and at least one product offering group.

6. The system of claim 5, wherein the product offering group comprises at least one selling unit.

7. The system of claim 5, wherein the instance of the application hierarchy comprises a plurality of product offering groups, each product offering group having at least one selling unit.

8. The system of claim 7, wherein the instance of the application hierarchy comprises a product uniqueness group comprising a particular selling unit from a first product offering group and another particular selling unit from a second product offering group.

9. The system of claim 1, wherein the software license component propagates the property of one selling unit to a property of another selling unit of a same product offering group.

10. The system of claim 1, wherein the first node and the another node are of a same product group.

11. The system of claim 1, wherein the application hierarchy is a tree structure that represents a logical product offering of software applications.

* * * * *